Figure 1:
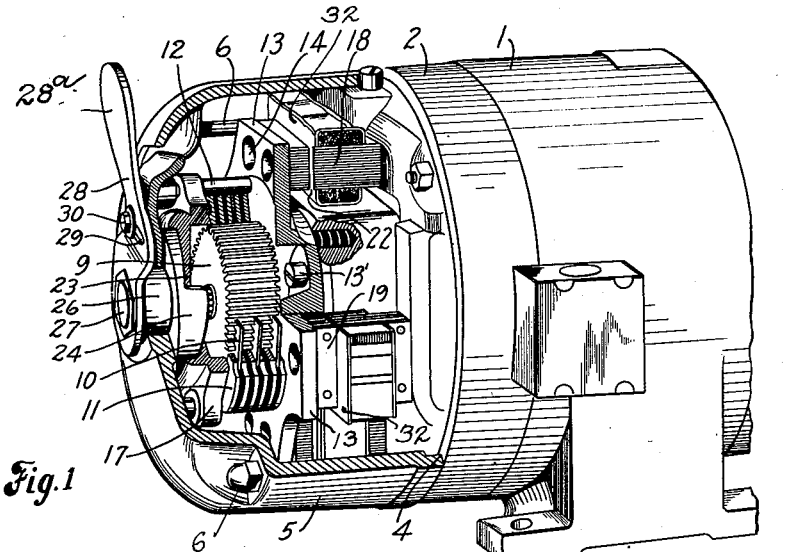

April 20, 1937.  E. P. LARSH  2,077,888
MOTOR BRAKE
Filed July 20, 1935   3 Sheets-Sheet 1

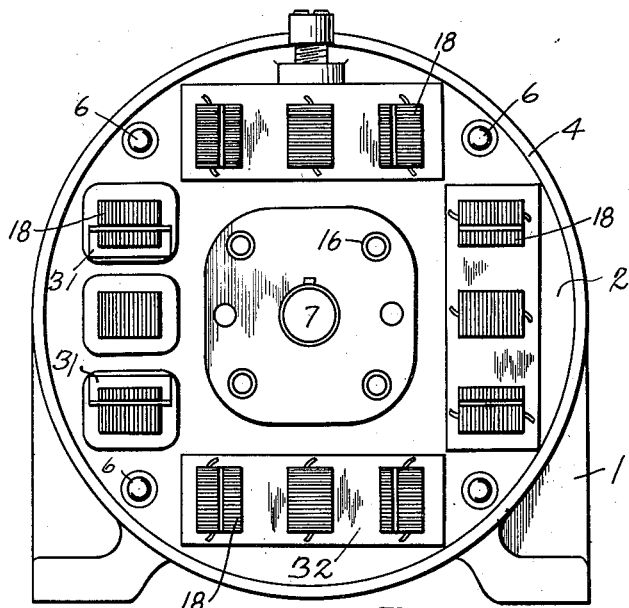
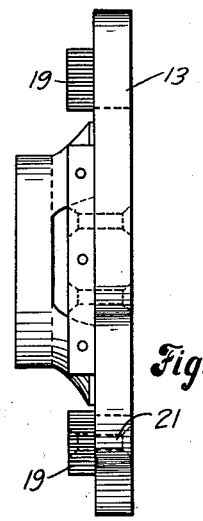
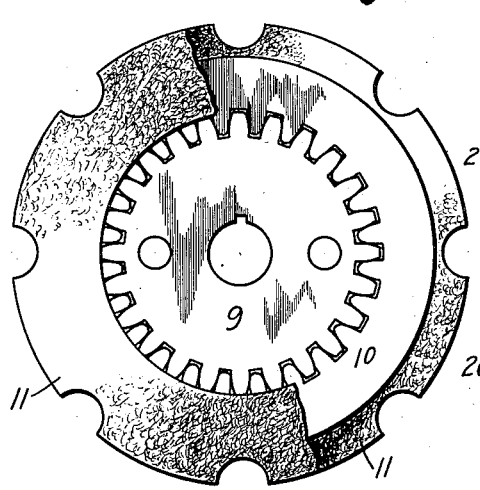
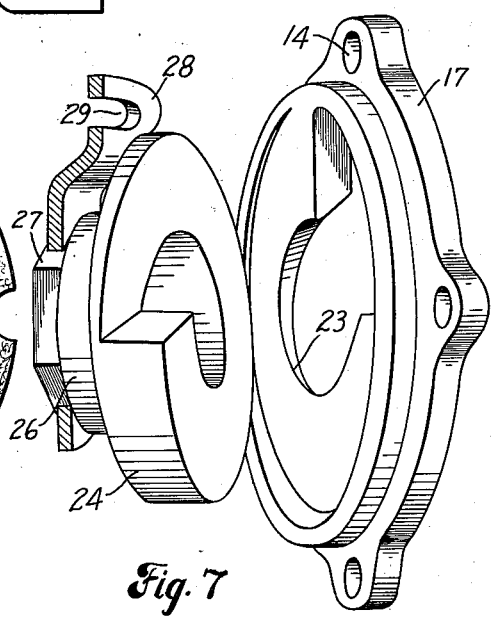
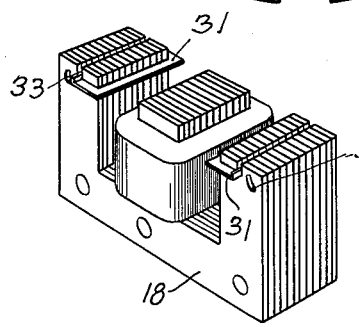

April 20, 1937. E. P. LARSH 2,077,888
MOTOR BRAKE
Filed July 20, 1935 3 Sheets-Sheet 3

Patented Apr. 20, 1937

2,077,888

UNITED STATES PATENT OFFICE 2,077,888

MOTOR BRAKE

Everett P. Larsh, Vandalia, Ohio, assignor to The Master Electric Company, Dayton, Ohio, a corporation of Ohio Application July 20, 1935, Serial No. 32,418

12 Claims. (Cl. 188—171)

This invention pertains to electric motor brakes and more particularly to electrically controlled multiple disc brakes for quick stopping, controlled stopping, or for holding motors or other mechanisms stationary under load.

In the preferred embodiment the brake mechanism is incorporated as a compact, integral part of an electric motor structure and inclosed in a continuation of the motor frame or housing at the end thereof opposite the power extension of the rotor shaft.

The brake discs are spring set and are electromagnetically released by a plurality of multiple pole magnets disposed in different radial positions about the axis of the structure in such relation as to exert equalized retractive influence upon the disc engaging means. The disc engaging tension of the actuating springs is manually adjustable from the exterior of the housing and means is provided for manual release of the brake discs independently of the magnetic control thereof.

The object of the invention is to simplify the construction as well as the means and mode of operation of braking mechanisms whereby they may not only be economically constructed but will be more efficient in use, automatic in action, uniform in operation and unlikely to get out of repair.

One of the important objects of the invention is to enable adjustment to compensate for wear upon the brake discs and to increase or decrease the brake effect and stopping time without varying the air gap relation of the control magnets and their armatures and without changing the tension of the springs.

A further important object of the invention is to maintain a coordinated relation between the size of the air gap between the magnets and their armatures and the consequent electromotive force of the magnets and the spring tension opposed thereto.

A further object of the invention is to provide a motor brake construction which will be quick acting, of few parts and compact form.

A further object of the invention is to produce a motor brake having a maximum arresting power in proportion to its size and number of friction discs.

A further and important object of the invention is to provide means for manually adjusting the brake without removing the housing or cover and to further provide means for releasing the brake to permit rotation of the power shaft when the electric current is off.

A further object of the invention is to provide an improved form of electro-magnet for controlling the engaging parts.

A further object of the invention is to provide an improved system of electrical control circuits.

A further object of the invention is to provide a quick adjusting means for varying the brake tension and for releasing the brake independently of electrical control.

A further object of the invention is to provide a motor brake construction having the meritorious characteristics and the advantageous features of construction herein mentioned.

With the above primary and other incidental objects in view as will more fully appear in the specification, the invention consists of the features of construction, the parts and combinations thereof, and the mode of operation, or their equivalents, as hereinafter described and set forth in the claims.

Figure 2:
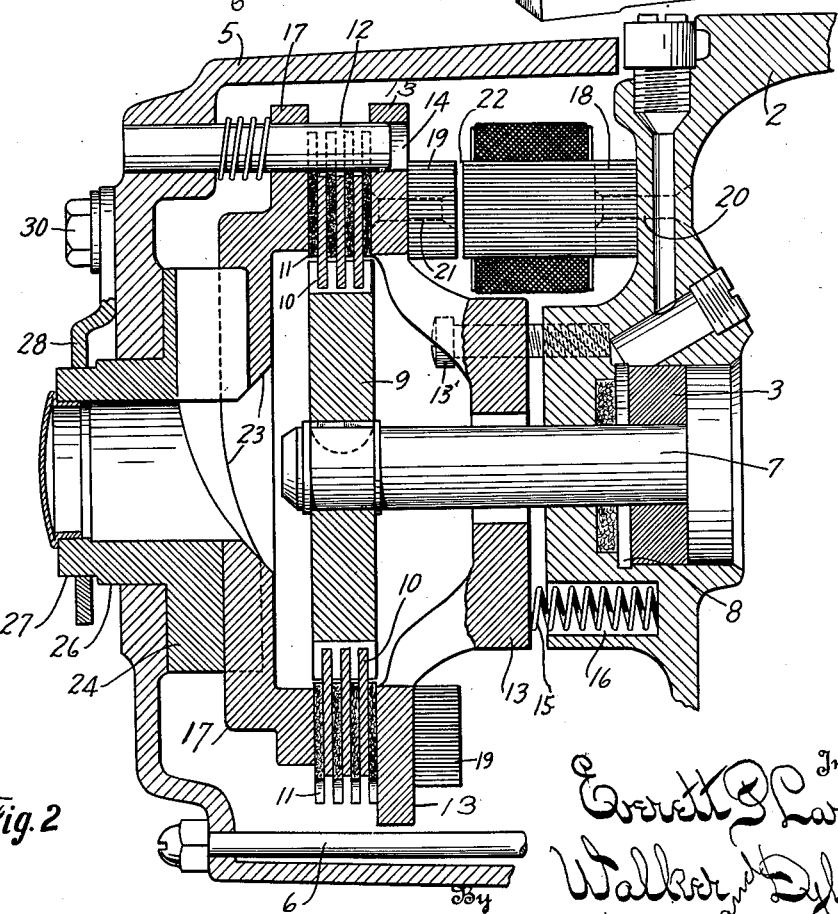

In the drawings wherein is shown the preferred but not necessarily the only form of the embodiment of the invention Fig. 1 is a perspective view of the assembled brake mechanism, forming the subject matter hereof, mounted upon an electric motor, a portion of the housing of which is broken away to better display the brake mechanism therein, Fig. 2 is an enlarged sectional view of the assembled brake mechanism, Fig. 3 is a front elevation of the magnet assembly. Fig. 4 is a side view of the armature mounting and pressure plate, Fig. 5 is a front elevation of the friction disc assembly partly broken away, Fig. 6 is a detail view of one of the electro-magnet cores, Fig. 7 is a perspective view of the complementary parts of the manual adjusting and release means, Figs. 8, 9, 10 and 11 are circuit diagrams of the magnet wiring connections for three phase series connection, three phase series parallel connection, and two phase or direct current motor parallel connection respectively. Like parts are indicated by similar characters of reference throughout the several views.

The present motor brake construction is designed for heavy duty operation such as control of elevators, hoists, machine tools, concrete mixers and for analogous installations, although it is to be understood that it is not limited to such applications.

Briefly stated, the brake includes hardened and ground steel rotor plates or rings splined upon a hub of large size carried upon the rotor shaft and alternating stationary rings of friction material between which the steel discs revolve. The number and area of the discs are sufficient that the braking torque at maximum braking action is greater than the starting torque of a polyphase motor with which the brake mechanism is employed.

When the electric current is off, the brakes are set by strong coil springs which urge the alternating steel and friction discs into frictional contact with each other.

When the motor is started current flowing through the brake magnet coils energizes the magnets to retract their armatures thereby compressing the springs to release the pressure upon the brake discs. The magnets continue to hold the coil springs under compression so long as current flows through the motor, and the discs and rotor may revolve freely. The instant the line switch is opened to stop the motor the magnets are deenergized permitting the full spring pressure to be exerted against the pressure plate and discs to bring the rotor to a quick stop. The degree of braking pressure and the time required for arresting rotation may be varied by adjustment of a manually rotatable abutment member.

Referring to the accompanying drawings 1 indicates a conventional electric motor for one of the usual heads or end frames of which there has been substituted the head or end frame 2 in which is provided the usual rotor shaft bearing 3. The head 2 is peripherally rabbeted at 4 to receive a cap-shaped housing 5 which encloses the brake mechanism. The housing 5 is secured in position by elongated bolt rods 6 which are substituted for the usual frame bolts of the electric motor 1.

The rotor shaft 7 is journaled in the anti-friction bearing 3 and then extends through an opening in the head 2 into the brake mechanism chamber within the housing 5. The anti-friction bearing 3 and the concentric shaft opening are provided with conventional oil arresting devices including the oil groove 8. Within the housing or chamber 5 the rotor shaft 7 carries an enlarged hub or disc 9 the periphery of which is splined for engagement therewith of a series of axially movable discs or rings 10 which rotate in unison with the rotor shaft and splined hub in alternating relation with a series of stationary discs or rings 11 of friction material. The stationary discs 11 are peripherally notched for engagement with a series of mounting studs 12 projecting inwardly from the terminal wall of the mechanism housing 5.

Mounted for axial movement at one side of the disc or ring assembly in concentric relation with the rotor shaft 8 is a pressure plate 13 having adjacent to its periphery spaced holes 14 within which the stationary guide studs 12 project. Adjacent to its center, the pressure plate 13 is slidingly mounted upon a series of studs 13' projecting from the central hub portion of the head 2.

The pressure plate 13 is normally urged toward and against the assembly of friction discs 10 and 11 by a series of helical expansion springs 15 seated in pockets 16 in the hub portion of the head 2 and bearing at their out ends against the pressure plate 13. The pressure plate 13 and friction discs 11 are axially movable upon the guide studs 12 while the intermediate brake rings 10 are similarly movable upon the splined hub 9 against an unyielding abutment plate 17 also carried by the guide studs 12.

The frictional clamping pressure of the stationary rings 11 under the influence of the pressure plate 13 and the helical springs 15, against the inter-leaved brake rings 10 carried by the splined hub 9 upon the rotor shaft, tends to retard the rotation of the latter. If the adjustment is such that the full reactive effect of the coil springs 15 is exerted upon the pressure plate 13 the frictional engagement of the brake ring assembly between the pressure plate and the abutment plate 17 is sufficient to hold the shaft 7 against rotation.

In order to retract the pressure plate 13 and thereby release the frictionally engaged rings or discs 10 and 11 to permit relative rotation there are provided upon the head 2 a series of electro-magnets 18 each cooperating with an armature 19 carried by the pressure plate 13.

The electro-magnets 18 are preferably though not necessarily four in number. These magnets 18 are arranged in different radial positions as are shown particularly in Fig. 3 whereby they exert an equalized retractive influence upon the pressure plate when the magnets are energized to retract the plate against the tension of the springs 15. The magnets 18 are of a multi-pole type and of laminated construction, the cores of which are preferably though not necessarily E shaped. Each brake magnet of a three phase motor is energized by three coils. Single phase and two phase motor brakes are energized by two coils per magnet. Direct current motor brakes likewise are provided with two coils per magnet. The laminated cores of the electro-magnet 18 are secured to the head 2 by rivets 20. The corresponding armatures 19 are secured in a similar manner to the rear side of the pressure plate 13 by rivets 21.

A certain definite relation is maintained between the size of the air gap 22 between the poles of the magnet and the corresponding armatures and the strength of the brake actuating springs 15. Since the electro-motive force exerted by a magnet varys inversely as the square of the distance between its armature and the pole face, the tension of the springs 15 is proportionately increased as the air gap 22 is decreased and vice versa.

The abutment plate 17 is provided with a central web portion 23 having a helical outer face which is engaged by a reverse helical face upon a rotatively adjustable head 24 mounted in the terminal wall of the housing 5. The rotative adjusting head 24 is provided with a hub 26 having a polygonal extension 27 projecting beyond the housing 5. The polygonal terminal 27 of the hub 26 engages with a segment 28 having an orifice fitting the polygonal extension 27, and also a concentric slot 29 through which extends a lock stud 30 screw threaded into the terminal wall of the housing 5. By loosening the stud 30 and rotatively adjusting the head 24 by oscillating the segment 28, the abutment 17 may be slidingly adjusted upon the studs 12 to vary the space between the abutment plate and the pressure plate 13, to correspondingly increase or decrease the effective clamping engagement of the friction rings therebetween under influence of the springs 15. That is to say, as the abutment plate 17 is adjusted toward the pressure plate by rotation of the head 24, the rings coming in contact with the abutment plate earlier in their compressive movement under influence of the pressure plate 13 and springs 15 will be subjected to greater pressure of the latter. To the contrary upon the rotation of the adjusting head 24 to permit the adjusting plate 17 to recede slightly upon engagement of the brake rings therewith the brake rings will be clamped under less spring tension and hence the braking action will be decreased. The opposing helical faces of the abutment 17 and the adjusting head 24 enables the spring tension under which the friction discs or rings are engaged to be quite uniformly and accurately varied without, however, changing the adjustment of the springs themselves.

When the abutment plate 17 is allowed to recede due to rotative adjustment of the head 24 thereby decreasing the braking effect, the pressure plate 13 is allowed a slight additional movement under influence of the springs which correspondingly increases the air gap between the magnet 18 and their armatures 19, but at the same time the springs 15 are correspondingly relaxed. Therefore the springs do not exert as great a resistance at the beginning of the retractive movement when the air gap 22 is enlarged as is exerted when the air gap is reduced by retraction of the pressure plates.

Thus the electro-motive force of the magnets due to the variation of the air gap is coordinated with the tension of the brake actuating springs 15.

When the current is off the brakes are set so that the tension upon the rings 10 and 11 must be released before the motor shaft may be rotated. This is effected by releasing the quadrant 28, as before described, and rotatively adjusting the head 24. After the brake has been released in this way and the motor set in operation, the pressure plate 13 will have been retracted by the magnets 18, after which it is necessary to reset the adjusting head 24 and abutment plate 17 to afford the desired stopping action.

It is desirable in some installations to release the brake quite frequently. For such conditions the head 24 is preferably provided with a hand lever indicated at 28a and cooperating with a suitable stop by oscillation of which the brake can be readily and quickly released and again reset to the same degree of operative tension.

Figure 8:
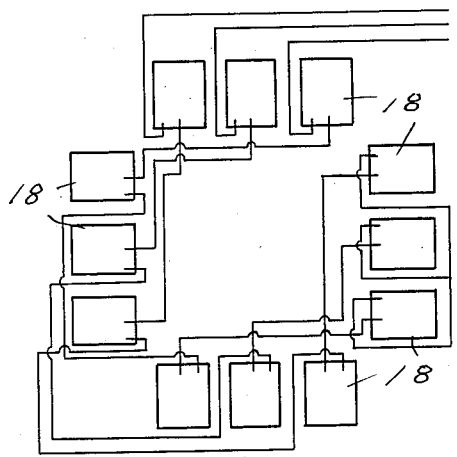
Figure 9:
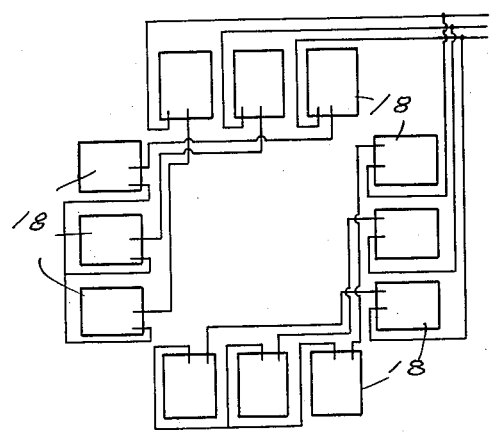
Figure 10:
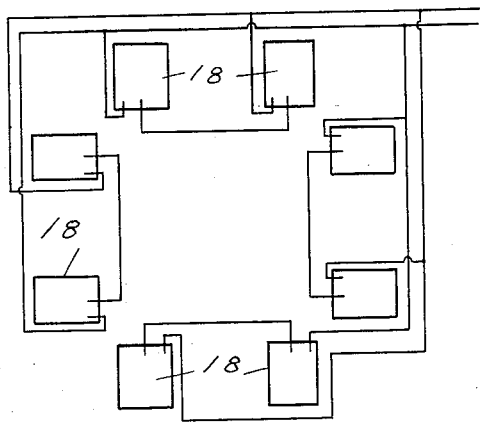
Figure 11:
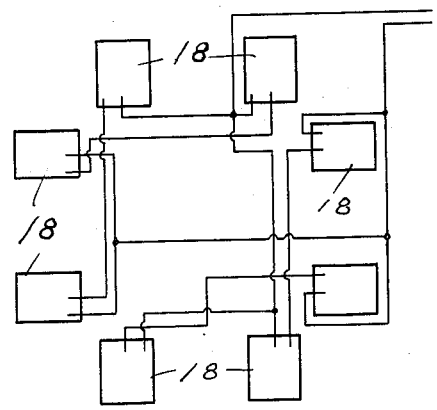

The electro-magnets 18 may be variously wound to meet different conditions of use and to agree with motors having different characteristics. In Figs. 8 to 11 inclusive there are illustrated typical magnet winding systems. In Fig. 8 the magnet windings are shown connected in series, whereas, in Fig. 9 they are disposed in series parallel relation. As before stated, brake mechanisms for two phased and for direct current motors are energized by but two coils per magnet, as is shown in Fig. 10. The outer poles of the magnet cores are preferably but not necessarily provided with shading rings 31 to control the flux flow and effect improved retractive action of the magnets.

The shading rings 31 are preferably, although not necessarily, stamped from sheet material, thereby affording an unbroken integral member, which in the present instance is rectangular, but which may be of other shape to agree with that of the magnet poles.

One side of the ring 31 is bent to substantially perpendicular relation with the general plane of the ring, for engagement in a transverse slot in the pole face of the laminated core, about one portion of which the remainder of the shading ring exteriorly extends. The shading rings overlie the coil windings on the respective magnet poles and serve to retain the windings in place. Over the windings and shading rings there are preferably superposed sheets 32 of fiber or other insulating material having therein spaced holes agreeing with the pole faces of the magnets, through which the magnet poles protrude. The entire assembly is then held together by small wires 33 extending through holes in the magnet poles and projecting on opposite sides thereof outside the insulating sheet where their ends are slightly bent to prevent displacement.

The use of the shading rings obviates a humming sound which was quite noticeable without them, and they tend to distribute or diffuse the attractive force thereby affording a more uniform action and efficient result.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms of modifications within the legitimate and valid scope of the appended claims.

Having thus described my invention, I claim:

1. A brake assembly associated with an electric motor for retarding the rotation of the motor shaft and carried wholly by the motor frame, including a splined hub carried by the motor shaft, a series of alternating non-rotative and rotative brake rings the latter being carried by the splined hub for unison rotation therewith but capable of axial adjustment relative thereto, a series of mounting studs upon which the non-rotative rings are mounted for axial adjustment, an axially movable pressure plate, a series of helical springs exerting pressure thereon to compress the brake rings one against the other, a series of electromagnets arranged in different radial positions, coacting armatures therefor carried by the pressure plate and attracted by the magnets to retract the pressure plate against the tension of the springs, an abutment plate mounted for axial adjustment relative to the brake rings against which the brake rings are pressed by the pressure plate under influence of the springs, said abutment plate having a helical lateral face, a rotative adjusting head having a complementary lateral helical face abutting that of the abutment plate and means for rotatively adjusting the head to vary the relation of the abutment plate to the brake rings and pressure plate, and thereby change the compression tension upon the brake rings.

2. In a brake assembly of the character described wherein multiple alternating rotative and non-rotative brake rings are subjected to axial compression between a spring pressed pressure plate and an opposing abutment member for arresting rotation of a shaft with which the rotative brake rings are operatively connected, and wherein the abutment plate is axially adjustable relatively to the pressure plate to thereby vary the degree of compression exerted by the pressure plate on the brake rings disposed between the plates characterized by a plurality of multi-pole electromagnets arranged in a parallelogram concentrically with the brake rings and pressure plate, coacting armatures carried by the pressure plate, and an electric circuit for energizing the electromagnets to attract their armatures and thereby retract the pressure plate against its actuating spring pressure to relieve the pressure upon the brake rings and release the shaft for rotation.

3. In a brake assembly of the character described wherein multiple alternating rotative and non-rotative brake rings are subjected to axial compression between a spring pressed pressure plate and an opposing abutment member for arresting rotation of a shaft with which the rotative brake rings are operatively connected, and wherein the abutment member is axially adjustable relatively to the spring pressed pressure plate to vary the degree of compression exerted on the brake rings disposed between the plate and the abutment characterized by a plurality of multipole electromagnets including substantially E-shaped cores therefor, arranged in different radial positions relative to the shaft and brake rings, armatures correlated with the magnets and carried by the pressure plate, and an electric circuit for energizing the magnets to attract said armatures and thereby retract the pressure plate against its spring tension to relieve the compression of the brake rings and so release the shaft for rotation.

4. In a brake assembly of the character described wherein multiple alternating rotative and non-rotative brake rings are subjected to axial compression between a spring pressed pressure plate and an opposing abutment member for arresting rotation of a shaft with which the rotative brake rings are operatively connected, and wherein the abutment member is axially adjustable relatively to the spring pressed pressure plate to vary the degree of compression exerted on the brake rings disposed between the plate and the abutment characterized by a plurality of multiple pole electromagnets including substantially E shaped cores therefor arranged in different radial positions relative to the shaft and braking rings, shading rings enclosing portions of the terminal poles of said E shaped cores, armatures correlated with the magnets and carried by the pressure plate, and an electric circuit for energizing the magnets to attract said armatures and thereby retract the pressure plate against its spring tension to relieve the compression of the brake rings and so release the shaft for rotation.

5. The combination with an electric motor including a motor head having a bearing therein for the rotor shaft of the motor, of a multi-disc type brake assembly for retarding the rotation of the shaft including alternating rotative and non-rotative braking rings, a spring tensioned pressure plate for compressing the brake rings, an abutment member against which the brake rings are compressed by said plate, means for adjusting the abutment member axially relatively to the spring tensioned pressure plate whereby to vary the degree of pressure exerted by the braking rings, one upon another, under the influence of the spring tensioned pressure plate electromagnetic means for retracting the pressure plate against its spring tension for relieving the compression of the brake rings and releasing the rotor shaft, a removable bell shaped housing carried by the motor head cooperating with the end frame to enclose the said brake assembly and means accessible exteriorly of the housing for varying the compression upon the brake rings.

6. In a magnetic brake assembly of the character described wherein multiple rotative and non-rotative brake rings are subjected to axial compression by a helical spring for retarding the rotation of a shaft with which the rotative brake rings are operatively engaged, characterized by an axially adjustable abutment plate against which the brake rings are compressed, a helical lateral face upon said abutment plate, a rotative adjusting head, a complementary helical lateral face upon the adjusting head engaging the helical lateral face of the abutment plate to vary its relation to the rings and thereby vary the braking effect thereof.

7. The combination with a multiple disc brake assembly and means for compressing the discs, of an adjustable abutment member therefor, a helical lateral face upon the abutment member, a rotatively adjusting head therefor including a disc having a helical lateral face conforming substantially to that of the abutment plate and bearing thereon, a hub for said disc and a mounting in which the hub is journaled for rotative adjustment whereby the position of the abutment member may be changed to vary the compression of the brake discs.

8. The combination with a multiple disc brake assembly and means for compressing the discs thereof, of means for varying the compression thereof including two relatively rotatable discs, reverse helical contacting lateral faces on the respective discs and means for rotating one of the said discs relative to the other.

9. The combination with a multiple disc brake assembly and means for subjecting the brake discs to compression, including an axially movable abutment plate, a lateral helical face thereon, an adjusting head including a lateral helical face disposed conversely of that of the abutment disc and contacting therewith, a hub for said head, a mounting in which the hub is rotatively mounted, a polygonal terminal upon said head and an operating member engaged with the polygonal terminal for rotatively adjusting the head to vary the relation of the abutment plate to the brake discs, and means for holding said head in its adjusted position.

10. In a multidisc brake of the character described wherein alternating rotative and rotative discs are subject to compression under spring tension to retard the rotation of a shaft with which the rotative discs are operatively connected, such compression being relieved by electro magnetic means in opposition to the spring tension, characterized by a pair of relatively rotatable discs arranged side by side and having complementary helical lateral contacting faces, and operating means connected with one of the discs for enabling manual partial rotation thereof relative to the other disc for relieving the compressive tension upon the brake rings independently of the electromagnetic means.

11. A multidisc brake of the character described, wherein alternating rotative and non-rotative brake rings are subjected to compression under spring tension to retard the rotation of a shaft with which the rotative discs are operatively connected, characterized by an axially movable pressure plate, an axially movable abutment plate, for varying the degree of compression exerted on the brake rings by compression movement of the pressure plate mounting studs common to the abutment plate, the pressure plate and the non-rotative brake rings upon which the said plates and rings are capable of to and fro adjustment, relative to each other, and means for independently adjusting the pressure plate and the abutment plate upon said common studs relative to the non-rotative brake rings and relative to each other.

12. A multidisc brake of the character described, wherein alternating rotative and non-rotative brake rings are subjected to compression under spring tension to retard the rotation of a shaft with which the rotative discs are operatively connected, an externally toothed disc carried by the shaft and surrounded by the brake rings, internal teeth within the rotative brake rings intermeshing with the external teeth of the disc for axial sliding, but non-rotative engagement therewith, a pressure plate and an abutment plate between which the rings are interposed, and means for independently adjusting said plates to vary the compressive tension in said rings.

EVERETT P. LARSH.